July 3, 1962  K. A. BÜHRLE  3,041,949
MEANS FOR AUTOMATICALLY REGULATING EXPOSURE TIME IN A CAMERA
Filed Feb. 10, 1959  2 Sheets-Sheet 1
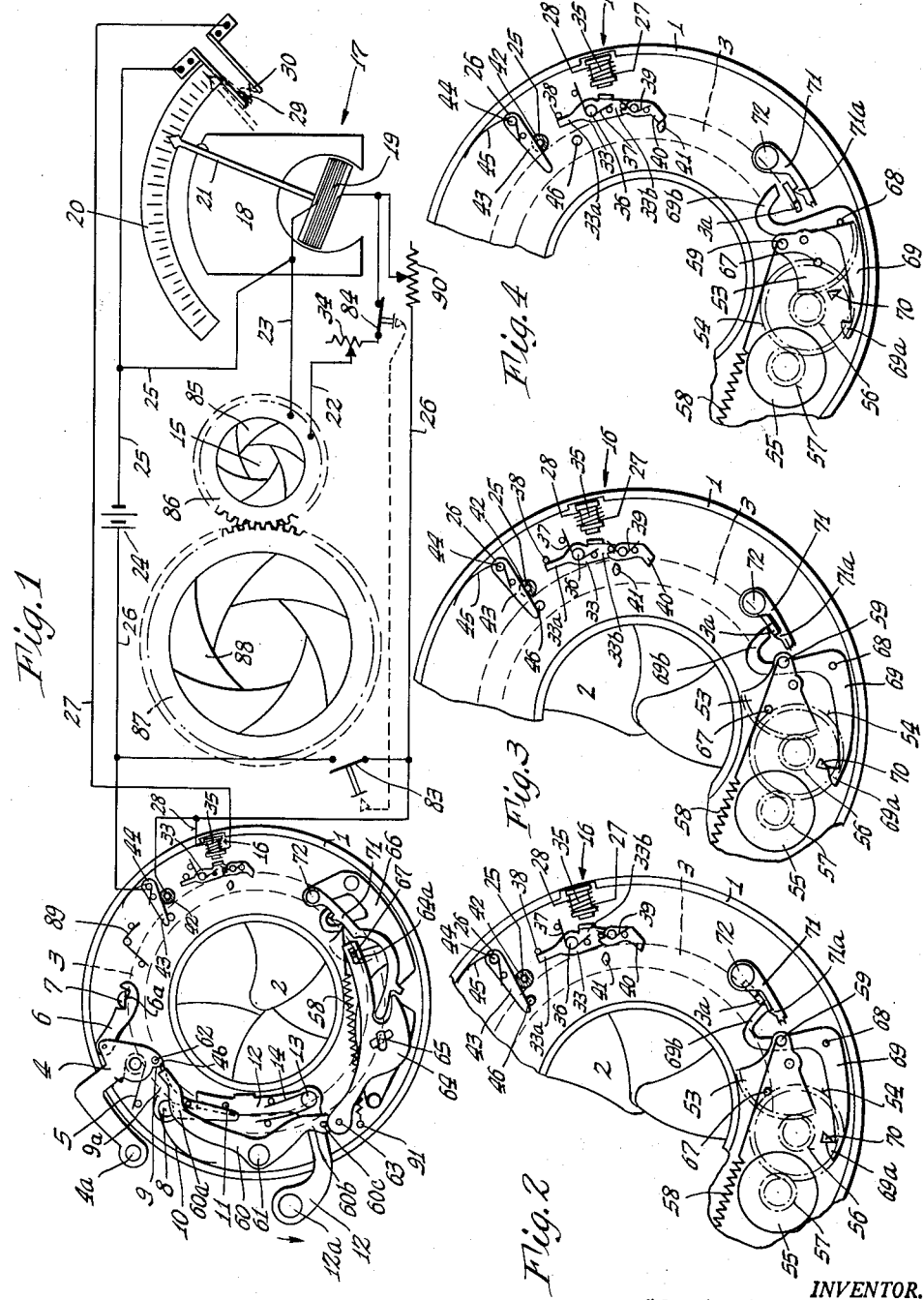
INVENTOR.
Karl A. Bührle
BY
Munn, Liddy, Daniels & March
ATTORNEYS

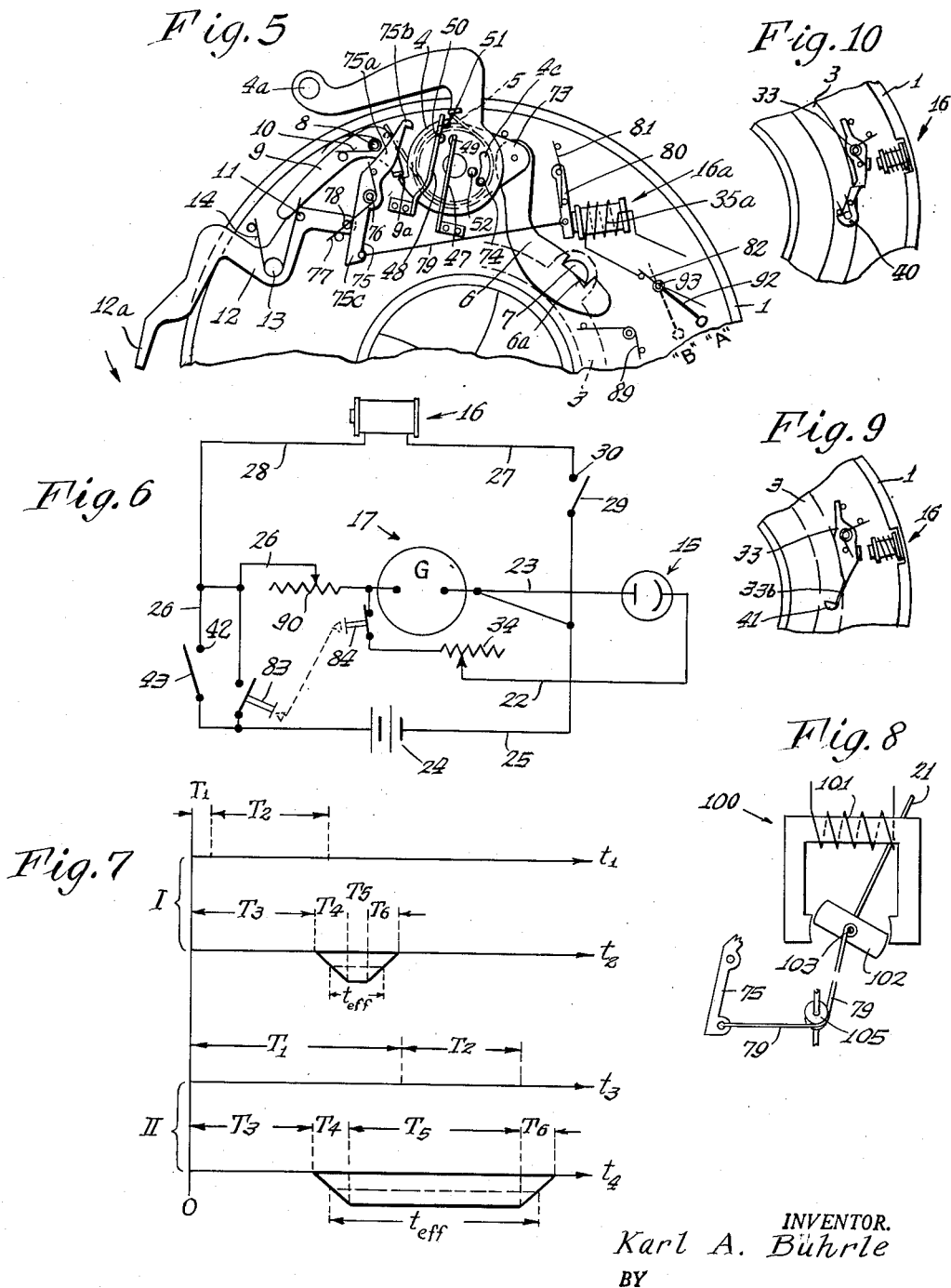

United States Patent Office 3,041,949
Patented July 3, 1962

3,041,949
MEANS FOR AUTOMATICALLY REGULATING EXPOSURE TIME IN A CAMERA
Karl A. Bührle, Hofen (Enz), Germany, assignor to Alfred Gauthier, G.m.b.H., Calmbach (Enz), Germany, a corporation of Germany
Filed Feb. 10, 1959, Ser. No. 792,379
Claims priority, application Germany Feb. 12, 1958
16 Claims. (Cl. 95—10)

This invention relates to the automatic regulation of speed in photographic cameras.

In the past various types of automatic speed or exposure regulating devices for picture-taking equipment or cameras have been proposed and produced. Such devices have had a number of disadvantages and deficiencies, particularly with respect to the considerable expense involved in their construction, as well as the lack of accuracy and reliability of operation.

An object of the present invention is to provide an improved method and means for effecting automatic speed regulation in a camera, both of which are characterized by a high degree of accuracy and reliability together with uniformity of performance, all without involving a considerable expense. Further, the method and means as provided by the invention are applicable to cameras of various types, regardless of their particular construction, and may be readily incorporated, and carried out, with a minimum of difficulty.

In accomplishing the above object, in accordance with the invention, the shutter of the camera after being released is held in its open position, and in response to the release of the shutter a constant level of electrical energy is applied to an electromagnetic system having a movable part, to cause the latter to attain a position of maximum deflection. The said movable part is normally held in a position of less deflection in response to energization of the electromagnetic system by a photoelectric element which is made to respond to existing light conditions. Upon the said movable part attaining the position of maximum deflection, the shutter which is being held open is released for closing, and accordingly the interval of time which was required for the movable part to travel from the position of low deflection to the position of maximum deflection is made to constitute a factor which determines the length of time that the shutter remains open.

The method, as provided by the invention, for effecting an automatic regulation of the speed of exposure is based on a well-known ballistic principle. A measuring system which is based on this principle distinguishes itself by a desirable simplicity, and by great reliability and accuracy. The reason for this is that the ballistic principle which is involved is in itself reliable and accurate, and concerns a simple and well-known mechanical system. The above advantages are had equally as well, with regard to the method provided by the invention.

In connection with the foregoing there is had the further important advantage that in carrying out the invention there are required no complicated, highly-sensitive or critical devices such as mechanical escapements or mechanisms for tracing the position of the movable part of a photoelectric measuring device. The novel, unobvious mode of operation of the speed regulating device as provided by the invention embraces rather the holding of a released shutter in a fully open position, and thereafter the closing of the thus-held shutter after an interval of time which is determined by the extent of movement of a deflection part of an electromagnetic system or device, said extent of movement being determined by a fixed point of maximum deflection and a variable or adjustable point of lesser deflection, the latter being determined by the intensity of the existing light conditions. Moreover, as a factor of the said time element there is involved the energization of the electromagnetic device by the fixed level of energy which is supplied from an unvarying source.

As stated, the non-fixed starting position of the deflection part of the electromagnetic device is determined by the existing light conditions, together with other exposure factors such as diaphragm values, speed of film, or filter characteristics. With these in consideration, the non-fixed starting position or position of lesser deflection of the deflection part may be thought of as a measure of the time interval which is utilized for holding the shutter in its open condition. Thus, the deflected positions of the said deflection part may be related to a suitable scale cooperating with a pointer on said part. With such an arrangement there is had the considerable advantage that without additional devices being required the operator is able to acquire a knowledge concerning the duration of time for which the shutter will be held open, prior to actually making the exposure, and is thus able to judge if the speed or duration of exposure will be suitable for the particular subject, considering the prevailing light conditions and the setting of members controlling other exposure factors.

A further special advantage of the invention resides in the fact that the inventive concept is not bound or limited to a fixed structure or to a fixed method of operation of a camera or camera shutter, but instead is applicable to cameras of all different kinds.

In the accompanying drawings and in the following specification the invention is explained by describing two different embodiments, both of which employ the method as provided by the invention. Thus, the special advantages of the method and of the devices of the invention are explained in detail.

FIGURE 1 is a schematic representation of a photographic intra-lens shutter with the cover plate thereof removed, and of a control and automatic speed regulating mechanism associated with the shutter for carrying out the method provided by the invention, by which an automatic speed regulation is obtained. The shutter is shown in cocked position.

FIGURE 2 is an enlarged fragmentary view of the shutter of FIG. 1, still in cocked position.

FIGURE 3 is a view like FIG. 2, but showing the shutter immediately after its release. A contact switch for the electromagnetic system or device is shown as having been closed, whereas the shutter blades are still in their closed positions, covering the exposure opening.

FIGURE 4 is a view like FIGS. 2 and 3 but showing the exposure opening as being uncovered by virtue of the shutter blades being shifted to their open positions. In this figure the shutter blade ring is retained in blade-opening position by means of a locking device.

FIGURE 5 is a fragmentary enlarged view of an intra-lens shutter with cover plate removed, illustrating another embodiment of the invention wherein different means are employed for effecting a control of the electromagnetic system or device. The shutter in FIG. 5 is shown in cocked position.

FIGURE 6 is a schematic diagram of the automatic setting system or means illustrated in FIG. 1.

FIGURE 7 is a chart illustrating the functioning of the device of FIGS. 1–4.

FIGURE 8 is a diagrammatic representation of an automatic control system different from that shown in FIG. 5 and wherein release of the open shutter blades for closing is effected by a mechanical drive actuated by a rotary type of electromagnetic device as distinguished from the ordinary magnet actuator of FIG. 5.

FIG. 9 is a fragmentary elevational view of a modified form of electro-magnetic latch provided for controlling the camera shutter.

FIG. 10 is a view similar to that of FIG. 9, showing yet another form of magnetic latch.

Referring to FIGS. 1 through 5, the intra-lens shutter casing or housing is indicated by the numeral 1, said housing containing the usual type of pivotally mounted shutter blades 2. The blades 2 are actuated in the usual manner by a shutter blade drive ring 3 which is indicated in dotted outline. For the purpose of opening and closing the shutter blades 2, the drive ring 3 is actuated by a cocking and driving disk 4, the latter having an actuating handle 4a and being powered by a coiled drive spring 5. The driving disk 4 is connected to the shutter blade ring 3 in the well-known manner by means of a latch or link 6 (FIGS. 1 and 5) which is pivotally connected to the disk 4 and has a mouth 6a engaging a pin 7 of semicircular cross section, the latter being fixedly mounted on the shutter blade ring 3. A spring 89 (FIGS. 1 and 5) engages the blade ring 3 and biases the same counterclockwise. For the purpose of latching the drive mechanism 4 in its cocked position there is provided a two-armed lever 9 which is pivotally mounted on a spindle 8, one arm 9a of the lever 9 cooperating with a projection 4b on the drive disk 4 as clearly shown in FIGS. 1 and 5. Under the action of a spring 10 the other arm of the lever 9 is held against a pin 11 carried by the shutter release lever 12. The lever 12 is pivotally mounted by means of a spindle 13 and is biased by a spring 14 in a clockwise direction. The release lever 12 is shown as having an actuating handle 12a which passes through a suitable slot in the shutter casing 1.

When the release lever 12 is actuated in the direction of the arrows in FIGS. 1 and 5 it will effect a release of the driving disk 4 by means of the intermediary lever 9. The drive disk 4 after release is driven clockwise under the action of the driving spring 5, causing the link 6 to first turn the blade ring 3 in a clockwise direction and thereafter to reverse the movement of the blade ring 3 and drive it in a counterclockwise direction. The clockwise and counterclockwise turning of the blade ring 3 effects an opening and closing of the shutter blades 2, as will be readily understood.

According to the present invention the above shutter action is utilized in a novel and unique manner to obtain an advantageous automatic regulation of the speed of exposure, by causing the blades 2 to dwell in their fully open positions for different intervals of time, the length of the dwell being determined by the amount of time required for a movable part (for instance the pointer 21 in FIG. 1) of an electromagnetic system or device (17 in FIG. 1) to traverse a certain portion of its entire path of travel.

Moreover, the said portion of the path of travel which is traversed by the movable part 21 is determined in a unique manner, by causing the movable part to start its travel or deflection at different starting points while always terminating its travel at a position of maximum deflection, the various starting points being in turn determined by the intensity of the existing light conditions. Such light conditions are translated by a photoelectric element (15 in FIG. 6) into electrical energy which is impressed on the electromagnetic device 17 to effect a certain initial deflection of the movable part, whereby the starting point of said part in its path of travel is established. After such establishment of the starting point, which is variable depending on the different existing light conditions, the act of releasing or opening the shutter is used to impress on the electromagnetic device 17 a constant voltage or level of energy sufficient to cause full scale deflection of the movable part 21 thereof. By a well-known ballistic principle the said moving part 21 of the electromagnetic device 17 will now require a certain interval of time to travel from its starting position as determined by the existing light conditions to its final, fully deflected position, and such interval of time, which is variable as determined by the intensity of light, is made to constitute a factor involved in the time during which the shutter 2 is maintained open. Upon the movable part 21 attaining its fully deflected position, the shutter blades 2 are released, to again close the exposure aperture. The structure by which the above automatic regulation of the speed or exposure is accomplished, embracing the method provided by the invention, includes a locking part 40 (FIG. 3) which is arranged to retain the released or open shutter in its fully open position, said locking part 40 cooperating with a stop 41 which is located on a part of the shutter drive mechanism, as for example the drive disk 4 or the shutter blade ring 3. The locking part 40 is released in response to the movable or deflection part 21 of the electromagnetic device 17 reaching its position of maximum deflection.

Such a locking part 40, when constituted as either a latch or a lever, may be constructed in a simple manner and may be readily incorporated in any camera structure without difficulty both as regards the space required and also the functioning of the locking part. This may be readily understood when it is considered that locking parts intended for this purpose, to retain a shutter in its open position, are well known in camera manufacture. An example of such a locking part 40 is the well-known B-mechanism, which is used to obtain non-automatic extended exposure times, such a mechanism being provided with a locking part to retain the shutter in its open position and being made responsive to actuation of the shutter release mechanism in order to become operative. Since such B-mechanisms are readily known as constituting standard equipment in most shutters and cameras, there thus already exists a structure which may be utilized to carry out the method provided by the invention, without requiring appreciable changes or modifications of the existing parts or components.

In the illustrated embodiments of the invention, the release of the said locking part 40 which holds the shutter in open position is effected by a movable part or armature 33 of an electromagnetic system or device 16, said device having a magnet coil 35 provided about a suitable magnetic core. A contact switch 29, 30 which is described in detail below, is arranged in the circuit of the said electromagnetic device or system 16, such contact switch being actuated by the movable or deflection part 21 of the first-mentioned electromagnetic device or system 17 as the deflection part 21 thereof attains its position of maximum deflection.

The use of a special or separate electromagnetic device or system 16 for actuating the locking part 40 which retains the shutter open has the advantage that the first electromagnetic device or system 17 may be actuated with but relatively little power, and may have a high degree of sensitivity and accuracy. This is because the said first system 17 is utilized to carry out only a switching function which requires little power, as compared with that required to release a locking device or part 40. For such requirement the first electromagnetic device or system 17 may be readily constituted as an electrical instrument movement or moving coil measuring device 17 (see FIG. 1). The measuring device 17 has a moving coil 19 disposed in the field of a permanent magnet 18. The moving coil 19 carries a pointer 21 constituting the movable part, arranged to cooperate with a fixed speed scale 20. As shown, the moving coil 19 is connected by means of wires 22 and 23 with a photo-electric element such as a photocell 15, and a variable resistor 34 is disposed in the wire 22 to effect a regulation of the current supplied by the photocell 15.

As shown in FIGS. 1 and 6 the battery 24 is utilized to provide a constant or unvarying source of energy for the first electromagnetic system, to effect the deflection of the movable part 19, 21 thereof for timing purposes, as will be brought out more fully in detail below. The battery 24 is connected by wires 25 and 26 with the movable coil 19 of the measuring device, and a variable resistor 90 is connected in the wire 26 for setting or adjustment purposes.

In accordance with the invention a desirable organization is obtained when, as shown by FIGS. 1 and 6, the battery 24 is utilized as a source of power not only for the first electromagnetic system 17 but also for the second electromagnetic device or system 16 as well. Such arrangement conserves space, and requires fewer parts while at the same time enabling a favorable switching circuit to be utilized. To so employ the battery 24 a connection is made from the electromagnetic device 16 by means of wires 27, 28 to the battery 24. Inserted in the wire 27 is a contact switch 29, 30 which is actuated by the moving coil 19 of the first electromagnetic device 17.

When the switch 29, 30 is not being actuated it is in open-circuit position as illustrated in FIG. 1, whereby the circuit is broken from the battery 24 to the second electromagnetic system 16. The closing of the switch 29, 30 is effected by the pointer 21 of the moving coil 19 as the said pointer and coil attain the position of maximum deflection, here indicated by the broken outlines at the extreme right end of the scale 20. For such maximum deflection of the pointer 21 the switch 29, 30 will be closed, this condition being also shown in broken outline in this figure.

The above circuit and switching arrangement has a distinct advantage in that the electromagnetic system 16 need be energized for only a short interval, thereby resulting in a small consumption of power and a sparing of the battery 24. This is due to the fact that the contact switch 29, 30 and the circuit for the second electromagnetic system 16 will only be closed momentarily to effect the release of the locking part actuated by the coil 35, for the purpose of permitting the open shutter to be again closed.

In addition to the above advantage, the provision of the single battery for energizing both the electromagnetic systems makes possible a simple, unobvious and reliable fuse or safety arrangement by which the first electromagnetic system is protected from damage. This safety or fuse arrangement becomes operative and effective due to the fact that shortly after energization of the first electromagnetic system 17 the current which is supplied by the battery is in part diverted and shared by the second electromagnetic system, thereby reducing the voltage which is applied to the first such system. In other words, upon the first electromagnetic system responding so that the deflection part thereof attains its maximum deflected position, such action will result in a reduction of the current flowing through the first electromagnetic system. The reduced current which then remains to energize the moving coil 19 of the first electromagnetic system may be proportioned in a manner to securely retain the pointer 21 in engagement with the switch 29, 30 to continue actuation of said switch as required. In the embodiment of the invention illustrated in FIGS. 1 through 4, the locking part which retains the shutter in its open position is constituted as a lever 33. The lever 33 may contain the movable part or armature of the second electromagnetic system 16 whereby these constitute a single unitary piece, thereby to effect a saving in parts and space. The lever 33 is pivotally mounted in the shutter on a spindle 36, and is biased clockwise by a spring 37 which tends to hold one arm 33a of the lever constantly in engagement with a fixed stop pin 38. For the purpose of retaining the shutter in its open position a latch 40 is provided on the other arm 33b of the lever 33, said latch being biased in a clockwise direction by a spring 39 and being arranged to cooperate with and engage a pin 41 carried by the shutter blade ring 3. When the lever 33 is not being attracted by the coil 35, the latch 40 carried by the lever may constitute an obstruction for the pin 41 on the ring 3. The latch 40 is so arranged that it may be bypassed by the pin 41 during the clockwise turning movement of the ring 3 as the shutter blades are being opened; however, when the shutter blade ring 3 starts to reverse and turn in a counterclockwise direction the latch 40 will engage the pin 41 and prevent any further movement of the ring, thereby preventing closing of the shutter blades, this being clearly illustrated in FIG. 4.

A locking part as above constituted, in conjunction with the circuit and switching arrangement above described, provides an especially simple and inexpensive arrangement for retaining the shutter blades in their open positions, while at the same time a reliable operation is had, in effecting this function. The only requirement for employing a locking part of the above type is that the drive mechanism of the shutter have a part experiencing reverse movements, the part moving in one direction to open the shutter and moving in the reverse direction to close the shutter.

Instead of the latch 40 being carried by the lever 33 it could function as well if carried by the shutter blade ring 3. Also, the latch could be omitted or dispensed with by arranging the arm 33b of the lever so that it is resilient or spring-loaded and cooperates directly with the pin 41.

Such arrangements are illustrated respectively in FIGS. 10 and 9. Considering first FIG. 10, the latch 40 is shown as being carried by the shutter blade ring 3, and as being engageable with the lever 33. In FIG. 9, the arm 33b of the lever 33 is shown as being thin and in the form of a leaf spring, said spring arm being engageable directly with the pin 41.

In carrying out the method of automatic speed regulation as provided by the invention it is necessary to establish a fixed relation between the release of the shutter and the connecting of the first electromagnetic system to the source of constant potential or battery 24. This can be attained in an advantageous manner, and above all one which does not hinder the operation of the camera, by providing in the circuit of the first electromagnetic system a contact switch arranged to be actuated in response to the movement of a part of the shutter drive mechanism, said switch being in open position when the shutter is closed or at rest, and being actuated to closed position at the time that the shutter drive mechanism commences to move.

In the embodiment of the invention illustrated in FIGS. 1 to 4 such a contact switch is constituted of a fixed contact pin 42 which is insulated from the shutter casing 1, and of a movable contact lever 43. The contact lever 43 is pivotally movable about a spindle 44, and in the rest position of the shutter (FIG. 1) the lever 43 is held in engagement with a pin 46 on the shutter blade ring 3 by means of a suitable spring 45 biasing the lever counterclockwise. When the shutter is released, the blade ring 3 moves in a clockwise direction and opens the shutter blades. For such action, the contact lever 43 is swung counterclockwise by the spring 45 and after a small amount of angular movement comes into engagement with the contact pin 42, thereby closing the circuit for the first electromagnetic system 17. This closing of the circuit energizes the moving coil 19 and causes the latter to turn in a clockwise direction until the pointer 21 reaches the position of maximum deflection closing the contact switch 29, 30.

In the embodiment of the invention illustrated in FIG. 5, the contact switch which may be used to connect a first electromagnetic system (similar to the system 17) to a battery is actuated by the cocking and driving disk 4. In this figure the contact switch comprises two contact supports 47 and 48 which are insulated from each other and fixedly mounted in the shutter casing 1. The contact supports 47 and 48 carry contact rivets 49 and 50 respectively. The support 48 is of spring-loaded or resilient construction, and constitutes the driven member of the switch.

In order that the contact switch remain open for both cocked and uncocked positions of the shutter, the drive disk 4 is provided with two actuating parts 51 and 52, the part 51 cooperating with the spring arm 48 when the shutter is cocked as shown, to lift the arm and separate it from the arm 47. The actuator pin 52 engages the spring arm 48 when the shutter is uncocked, and similarly lifts the arm 48 from engagement with the arm 47, again to open the switch. It will be understood that the actuator pin 52 in its movement clears the arm 47 so as to avoid interference therewith. The arm 47 is preferably insulatedly mounted to isolate it from the ground or casing 1 of the shutter.

Both of the above-described contact switch arrangements function to maintain the circuit of the first electromagnetic system (as for example the system 17 considering the switch 42, 43) open during the rest positions of the shutter, and to momentarily close the said circuit for a short interval during which the shutter is in action. This results in a small power consumption for both the first and the second electromagnetic systems.

In further developing the invention there is provided (FIGS. 1–4) a delay device, which functions to delay the start of the opening of the shutter with respect to the closing of the contact switch 42, 43.

By the provision of such delay device the movable part or coil 19 of the first electromagnetic system 17, FIGS. 1 and 6, which is connected with the battery 24 in response to closing of either of the above contact switches, may be energized a predetermined small interval of time ahead of the start of opening movement of the shutter blades. With such arrangement the movable part 19 need only traverse a portion of its total path of deflection in the time interval between the start of the opening movement of the shutter blades and the instant when the shutter blades are again to be closed. Thus, the control command for the release of the open shutter, that is, the initiation of operation of the control device to close the shutter, may be given during the start of the opening movement of the shutter blades.

By virtue of this arrangement it is possible, with the device of the present invention, to obtain exposure times of the shortest duration without such times being affected or influenced by the reaction time of the second electromagnetic system comprising the electromagnet 16. In accomplishing this, the time delay which may be effected by the present control device is so calculated that its duration is not smaller than the reaction time of the electromagnetic system 16, such reaction time for example being that which elapses between closing of the circuit of the magnet and the actual movement or actuation of the lever 33. These relationships are illustrated in the chart given in FIGURE 7. In this chart, on the first time diagram $t_1$ there are entered one after another the time of movement $T_1$ of the moving coil 19, and the reaction time $T_2$ of the electromagnetic system 16. The moving time $T_1$ depends on the length of the path of movement of the coil 19, whereas the reaction time $T_2$ is always a constant. On the second time diagram $t_2$ shown in FIG. 7 there are illustrated the time sectors of an intra-lens shutter, taken from a typical working diagram thereof. The delay time is indicated at $T_3$, the opening time of the shutter at $T_4$, the open time of the shutter at $T_5$ and the closing time at $T_6$.

On these time diagrams as considered in connection with FIGS. 1–4, $t_1$ and $t_2$, denoted by a bracket marked with I, only a very small moving time $T_1$ of the moving coil 19 is shown. This would indicate that the intensity of illumination is very strong, and accordingly the starting position of the pointer 21 is only a very small distance from the position of maximum deflection at the switch 29, 30. The effective time of exposure as a consequence of these conditions has to be very short. Evidently this is fully realized on the basis of the existence of the delay time $T_3$ the size of such delay time differing only a very little from the reaction time $T_2$ of the electromagnetic system 16. In contrast to this, the time diagrams indicated by the bracket labeled II is based on a relatively long or great moving time $T_1$ of the moving coil 19, such as would exist where the intensity of the existing light conditions is appreciably less than that existing for the time diagrams I. This much lesser illumination requires a correspondingly greater open time $T_5$ and with this a proportionately greater effective time $t_{\text{eff}}$. Thus, the difference of the exposure times for the diagrams I and II corresponds exactly to the difference of the times $T_1$ given in these diaprams.

As shown by the embodiment of the invention illustrated in FIGS. 1–4, the device which is employed for delaying the start of opening of the shutter blades comprises a gear retarding mechanism and a releasable locking device of well-known construction. Such gear-retarding mechanism is of the type which is self-powered, being released for operation in response to releasing movement of a part of the shutter drive mechanism and the release being effected subsequent to closing of the contact switch 42, 43. The locking part, which is associated with the gear retarding mechanism is released by the latter after it has run down a certain predetermined extent. It is understood that the running down of the retarding mechanism thus delays the opening of the shutter, and that actuation of the locking part by such mechanism after a predetermined length of time releases the shutter for its opening movement.

The gear retarding mechanism comprises a toothed segment 53, FIGS. 2, 3 and 4, a gear 54, a fly wheel 55 and also pinions 56 and 57. The power means for the mechanism comprises a driving spring 58 which is hooked at one end onto the fixed pin 91 (FIG. 1) and which is secured at its other end to a pin 59 of the toothed segment 53.

In the illustrated embodiment of the invention the cocking of the drive spring 58 is effected simultaneously with the cocking of the shutter drive spring 5. For this purpose, there is provided as shown in FIG. 1 a lever connection between the disk 4 and the toothed segment 53. This lever connection comprises a lever 60 which is pivotally mounted on a spindle 61 in the shutter casing 1. One arm 60a of the lever 60 cooperates in a well-known manner with a chamfered pin 62 of the disk 4. The other arm 60b of the lever 60 has a pin-and-slot connection 60c, 63 with a two-armed lever 64 the latter being pivotally carried by a pin 65 secured to the upper bearing plate 66 of the gear retarding mechanism. The other arm of the lever 64 has a pin-and-slot connection 64a, 67 with the toothed segment 53.

The gear retarding mechanism is retained in its cocked position by a two-armed locking lever 69, said lever being pivotally mounted by means of a spindle 68 and cooperating by means of a ratchet nose 69a with a pin 70 of triangular cross section, FIGS. 2 and 4, fixed to the gear 54. The ratchet nose 69a of the lever 69 may be clearly seen in FIGS. 2, 3 and 4. The release of the locking lever 69 to free the gear retarding mechanism for operation, is effected by an arm 3a on the ring 3. When the shutter is initially released, the arm 3a strikes the arm 69b of the locking lever 69 and shifts the lever counterclockwise so that the ratchet nose 69a thereof is disengaged from the pin 70 of the gear 54. This release of the gear retarding mechanism takes place after the shutter blade ring 3 has traveled only a slight distance. Due to the overlapping relation of the shutter blades, the shutter aperture still remains tightly closed.

The locking device which holds the released shutter drive mechanism from opening the shutter after the closing of the contact switch 42, 43 in the circuit of the first electromagnetic system 17 and after release and starting of the gear retarding mechanism comprises a one-armed lever 71 which is pivotally mounted about a spindle 72 carried by the upper bearing plate of the gear retarding mechanism. The lever 71 cooperates by means of a ratchet nose 71a with the arm 3a of the shutter blade ring 3. This action occurs after the arm 3a of the ring has released the locking lever 69 of the gear retarding mechanism, to initiate the operation of the latter. Thereafter, the release of the locking lever 71 is effected in response to the operation of the gear retarding mechanism. When this mechanism runs down, it moves the lever 64 having a driving connection with the locking lever 71, as is well understood in the art.

The operation of the device illustrated in FIGS. 1 to 4 by which the method of the invention is carried out, is as follows:

The camera release lever 12 is first actuated in the direction of the arrow shown in FIGS. 1 and 5. This releases the cocking and driving disk 4 which, in these figures, is shown in its cocked position. The released disk 4 now drives the shutter blade ring 3 in a clockwise direction. At first, under the action of the spring 5, the contact lever 43 is brought into engagement with the contact pin 42, whereupon the first electromagnetic system is energized by the battery 24. By virtue of such energization, the moving coil 19 of the electromagnetic system is made to deflect and move toward its position of maximum deflection from a starting position which is variable and which is determined by the intensity of the existing light conditions. Such starting position is effected by current from the photocell 15 which energizes the coil 19, and which deflects the latter and the pointer 21 more or less, depending on the strength of the light.

Upon release of the shutter blade ring 3 the arm 3a thereof strikes the arm 69b of the locking lever 69, this occurring subsequent to closing of the switch 42, 43. The locking lever 69 in being actuated releases the gear retarding mechanism for operation, and upon this occurring the arm 3a of the blade ring becomes engaged with the ratchet nose 71a of the lever 71, whereupon the blade ring is halted and prevented from opening the shutter blades. The spacing between the arm 69b and the ratchet nose 71a is sufficient to enable the locking lever 69 to be completely actuated for release of the gear retarding mechanism. The said mechanism now runs down, and in so doing it shifts the lever 64 which in turn actuates the locking lever 71 in a counterclockwise direction, for the purpose of releasing the retained shutter blade ring 3. After this has occurred and the ring 3 is released it continues its motion in a clockwise direction under the action of the drive spring 5, whereby the shutter blades 2 are fully opened.

After the blades 2 have reached their fully open positions, they are retained in these positions by virtue of the engagement of the locking lever 33, 40 with the pin 41 of the shutter blade ring 3, such engagement preventing the reverse or counterclockwise movement of the blade ring which would effect a closing of the blades. A release of the blade ring 3 from the locking lever 33, 40 for closing of the shutter blades is effected only in response to the pointer 21 of the electromagnetic system 17 reaching and actuating the contact switch 29, 30 whereupon closing of such switch causes energization of the electromagnet 16 to actuate the locking lever 33, 40. When the electromagnet 16 is energized (by power delivered from the battery 24) the locking lever 33, 40 is shifted counterclockwise to disengage the latch 40 from the pin 41 on the blade ring 3. Toward the end of the resulting closing movement of the shutter blade ring 3 which is now released, the contact switch 42, 43 which has been previously closed by clockwise movement of the ring is released so that it becomes open. Thus, the moving coil 19 is disconnected from the battery 24 and returns to a starting position which is dependent on the intensity of the field of illumination and the strength of the current which is supplied by the photo-electric element 15. At the same time, in response to opening of the switch 42, 43 the magnet coil 35 becomes de-energized, so that under the action of the spring 37 the lever 33, 40 returns to its starting position as shown in FIGS. 1, 2 and 3.

Another construction for delaying the start of the opening movement of the shutter with respect to the closing of the contact switch controlling the circuit of the first electromagnetic system is shown in FIGURE 5. Here, for the purpose of effecting a delay, a lost-motion connection is provided between the cocking and driving disk 4 and the remainder of the shutter driving mechanism. Such lost-motion driving connection is effected by connecting the driving link 6 which affects actuation of the shutter blade ring 3 to a separate disk 73 which is not rigid with the driving disk 4 but is coaxially arranged with respect to the latter. The separate disk 73 has a pin and slot connection 4c, 74 with the disk 4, as clearly seen in FIG. 5. After the release of the driving disk 4 and the closing of contact switch 49, 50 (which may be connected to energize a first electromagnetic system, such as the system 17 in FIG. 1) such closing being effected by the disk 4 the latter continues to turn clockwise through a predetermined angle, during which the driving link 6 is not actuated. Such angle, it will be readily understood, is determined by the length of the arcuate slot 4c in the disk 4. When the end of the slot 4c engages the pin 74 on the disk 73, the latter will be driven by the driving disk 4 and in turn will actuate the driving link 6 so as to operate the shutter blade ring 3. Accordingly, the said ring is actuated a predetermined time after closing of the switch 49, 50 is effected.

In the embodiment of the invention illustrated in FIG. 5 a two-armed lever 75 is provided, to constitute a stop for holding the released shutter drive mechanism in shutter opening position. The lever 75 is pivotally mounted on a spindle 76 in the shutter casing 1 and is biased in a clockwise direction by a spring 77. One arm 75a of the lever 75 has a ratchet nose 75b which cooperates with the projection 4b of the cocking and driving disk 4. The other arm 75c of the lever 75 is normally held in engagement with a pin 78 carried by the release lever 12, this being effected by the action of the spring 77.

When actuating the camera release lever 12 the locking lever 9 which is holding the cocking and driving disk 4 in its cocked position is turned clockwise against the action of the spring 10, thereby to release the disk 4. At the same time, under the action of the spring 77 the locking lever 75 is shifted clockwise to present its ratchet nose 75b in the path of movement of the projection 4b. Thus, the projection 4b will strike the ratchet nose 75b when the disk 4 is in a position which corresponds to the fully open positions of the shutter blades 2. Thus, the disk 4 is retained in its shutter opening position until again released by the locking lever 75. Such release is effected in an automatic manner, as described below. Also, it will be noted here, however, that upon release of the lever 12 the spring 14 thereof will effect a clockwise return of the lever, and this will in turn actuate the locking lever 75 in a counterclockwise direction to again release the driving disk 4.

The above-described arrangement constitutes the releasable locking or retaining means of a well-known type of device for obtaining "B" shots or exposures. With the mechanism of the present invention, the said retaining device is effective when the setting lever 92 is set to the position "B" as indicated by the dotted outline in FIG. 5. Said setting lever 92 is pivotally mounted on a spindle 93 and can be set in two positions, either "A" or "B" as indicated.

In accordance with the present invention, the above-described locking device is arranged to retain the shutter blades in their open positions when utilizing the automatic control of the invention, and by such organization there is obtained an appreciable saving of space and a reduction in the number of components. For this purpose, the lever 75 is connected with the movable part or armature of a second electromagnetic system 16a, and in FIG. 5 such connection is illustrated as a cord 79 which at one end is attached to the arm 75c of the lever 75 and at its other end secured to the movable part or armature 80 of the second electromagnetic system 16a. Such movable part or armature 80, as shown in FIG. 5, is constituted as a one-armed lever which is biased in a counterclockwise direction by means of a spring 81. The spring 81 is made to be weaker than the spring 77 of the locking lever 75, thereby to render it ineffective by itself to shift the locking lever 75 counterclockwise.

The mode of operation of the device illustrated in FIG. 5 by which the method of invention is carried out, is as follows:

When the lever 92 is shifted from position "B" to position "A" the automatic contact switch 82 (FIGURE 5) is closed. Such automatic contact switch 82 is arranged in the circuit of the second electromagnetic system 16a, and is open for the "B" setting. If now the shutter release lever 12 is actuated, the locking lever 75 under the action of the spring 77 thereof will be shifted clockwise just as when making pictures utilizing a "B" exposure. Such shifting will move the lever 75 from the position shown in FIG. 5 into a locking position wherein the ratchet nose of the lever 75 will be disposed in the path of movement of the projection 4b of the driving disk 4. The locking lever 75 reaches this locking position before the lever 9 releases the cocked disk 4. By virtue of the cord connection 79 between the lever 75 and the armature 80 associated with the magnetic coil 35a of the second electromagnetic system, the lever 75 is swung clockwise against the action of the spring 81. This occurs by reason of the fact that the spring 77 is made stronger than the spring 81 and can overcome the action of the latter spring.

After release of the driving disk 4 by the locking lever 9, the disk releases the spring loaded contact support 48 prior to the start of its running down movement so that the contact 50 of the support 48 is engaged with the contact 49, thereby making it possible to close a battery circuit through a first electromagnetic system like the system 17 of FIG. 1. In consequence of this, the moving coil of such system can now deflect clockwise to its position of maximum deflection.

After the disk 4 has turned clockwise an extent corresponding to the length of the slot 4c thereof, it picks up the pin 74 and the disk 73 and carries these along to drive the link 6 and the blade ring 3, so as to open the shutter blades. Upon the blades reaching their open positions, the disk 4 will be interrupted in its clockwise turning by virtue of engagement of the projection 4b thereof with the ratchet nose 75b of the lever 75.

The construction of FIG. 5 is an alternative to the second electromagnetic system 16 of FIG. 1, and when replacing the same in the FIG. 1 circuit results in a similar operation of the retained part of the circuit, as follows: The retaining of the shutter blades in their open positions is continued until closure of the contact switch 29, 30 occurs under the action of the pointer 21 of the moving coil 19, as said pointer and coil reach their positions of maximum deflection. Upon the switch 29, 30 closing, an energization of the magnet coil 35 will be effected, whereupon the armature 80 associated with such coil will be attracted counterclockwise. Due to the cord connection 79 existing between the armature 80 and the locking lever 75, the latter will now be shifted counterclockwise against the action of its spring 77, thereby freeing the driving disk 4 to enable the latter and the blade ring 3 to close the shutter blades. Shortly before reaching full uncocked or blade-closing position, the driving disk 4 will again effect an opening of the contact switch 49, 50 by virtue of the pin 52 of such disk shifting the contact arm 48 away from the contact arm 47. In consequence, the moving coil 19 is disconnected from the battery 24 so that the said coil returns to its variable starting position as determined by the energization supplied by the photocell 16. In response to reopening of the switch 49, 50 the magnet coil 35 will also become deenergized. In order for the operator to ascertain beforehand whether or not the battery 24 can deliver a current of the value required to fully deflect the coil 19 and pointer 21, the first electromagnetic system 17 can be connected to the battery by means of a lever 83 arranged to be manually actuated. When such lever is operated to connect the battery with the electromagnetic system 17 the pointer 21 must deflect to a certain point on the scale 20, indicating that the battery 24 has the necessary power to effect a full scale deflection. If such mark is not attained by the pointer 21, the resistor 90 may be varied to bring the pointer 21 to the correct position. Then the device is known to be in the state of readiness for providing correct automatic speed settings.

In order to disconnect the photoelement 15 from the measuring device 17 for this checkup, a further contact switch 84 is provided in the circuit 22, 23 of the photoelement. The contact switch 84 is mechanically coupled with the switch 83 for simultaneous actuation so that when the switch 83 is open the switch 84 is closed and vice versa.

In the illustrated embodiments of the invention the release of the locking part which retains the shutter in its open position is effected by means of the first electromagnetic system. Due to such system being constructed to have a small capacity and a high degree of sensitivity, the moving coil 19 thereof is required to only give the command for switching on the second electromagnetic system 16, which latter now influences the locking part.

In another way, the said locking part could be released by virtue of a mechanical connection between the same and the first electromagnetic system whereby full scale deflection of the latter will cause such release. With such organization the first electromagnetic system must be made sufficiently powerful to overcome the work required to actuate the said locking part. This may be effected either by the application of a corresponding transmission having a mechanical advantage, between the said movable part and the locking part or by the provision of an electrical or electronic amplifier between the photoelectric element and the first electromagnetic system, to increase the power which is made available for such system. The structure of such an amplifier is not the subject of the present invention, so that it is not explained herein in detail.

In the case of a direct mechanical actuation of the locking part by the movable or deflection part of the first electromagnetic system, the latter preferably can be constituted as a turning or hoisting magnet.

A transmission of the above mentioned mechanical type is illustrated schematically in FIG. 8. In this figure, an electromagnet 100 is illustrated, having a coil 101 which would be connected in place of the moving coil 19 of the first electromagnetic system 17. A rotary armature 102 is provided, carried by a spindle 103 of small diameter, about which the cord 79 is wrapped in the manner of the windings of a windlass. Energization of the coil 101 will cause a counterclockwise turning of the armature 102, thereby to release the cord 79 so as to permit counterclockwise turning of the locking lever 75 to release the driving disk 4 so that the latter may continue its movement to close the shutter blades. The cord 79 may be made to extend in different directions by suitable direction-changing pulleys, one such pulley being indicated at 105.

A consideration of the diaphragm aperture which is to be adjusted on the camera with respect to the regulation of the exposure time may be effected in a simple manner, as shown in FIG. 1, by arranging in front of the photoelectric element 15 a device for altering the size of the illumination field of the photoelectric element. This device is shown as constituting a diaphragm 85, which may be actuated or adjusted by means of a ring 86. In order to avoid requiring a special setting operation of the diaphragm 85 it may be coupled in a well-known manner with the setting of an intra-lens diaphragm, marked 87, 88 as indicated. Due to the fact that the setting ring 87 of the lens diaphragm and the setting ring 86 of the diaphragm coordinated to the photoelectric element both have exterior teeth which are in engagement with each other, a simple and advantageous coupling between these may be established. By effecting a relative shifting of the two diaphragm setting devices 86, 87 with respect to each other, other exposure factors besides diaphragm, such as speed of film, and filter factors can be considered. Such relative shifting, for example, can be effected by uncoupling the setting rings of the two diaphragms, and by adjusting the setting ring 86 of the diaphragm 85 coordinated to the photoelement 15, to take into account film speed or filter scale. Further, in place of the diaphragm device 85 which alters the size of the illumination field of the photoelectric element 15, or in addition to such device for alteration of the illumination intensity of the photoelement there could be provided a movable photometric wedge in front of the photoelement 15, and a consideration of various other exposure factors could be taken into account by a device of this type and also in a well-known manner by suitable electrical means. In addition to this, a variable resistor, preferably having a logarithmic characteristic could be provided in the circuit of the photoelement 15.

I claim:

1. In a photographic camera, in combination, a photoelectric element; an electromagnetic device energized by said element, said device including a movable deflection part having a path of movement between minimum and maximum positions, said part being positionable at an intermediate position as determined by the level of energy supplied by the photoelectric element in responding to existing light conditions; a substantially unvarying source of energy separate from said photoelectric element, for energizing the electromagnetic device to effect a deflection of the deflection part thereof to the said maximum position; a shutter; means for effecting opening of the shutter; means operative after movement of the said shutter toward open position, for connecting said source of energy to the electromagnetic device to effect maximum deflection of the said deflection part; releasable means for holding the shutter in open position after movement of the shutter thereto; and means rendering inoperative said immediately preceding means in response to said deflection part attaining its said maximum deflection.

2. The invention as defined in claim 1, in which the releasable means for holding the shutter in open position comprises a spring-charged locking part and a cooperable stop, the said stop being connected to the means for effecting opening of the shutter.

3. The invention as defined in claim 2, in which the means rendering inoperative the releasable holding means comprises a second electromagnetic device and a contact switch arranged to be actuated by the movable deflection part of the first-mentioned electromagnetic device as the said part attains the position of maximum deflection.

4. The invention as defined in claim 3, in which the said contact switch is connected to the substantially unvarying source of energy to energize the said second electromagnetic device therefrom.

5. The invention as defined in claim 3, in which the said locking part constitutes the movable part of the second electromagnetic device.

6. The invention as defined in claim 2, in which the means for effecting opening of the shutter includes a reversibly movable part of the shutter drive mechanism, in which the said locking part comprises a pivotally mounted lever having a spring-loaded latch, said stop being carried by the said reversibly movable part and said latch permitting the stop to bypass it for movement of the reversibly movable part in one direction and holding the said stop when the movement of the said part is reversed.

7. The invention as defined in claim 1, in which the means for connecting the source of energy to the electromagnetic device includes a contact switch in the circuit of said device and an actuator for said switch, responsive to movement of the shutter-opening means to effect a closing of the circuit, said contact switch being normally open when the shutter is in a position of rest.

8. The invention as defined in claim 7, in which there are provided means whereby the said switch actuator effects a closing of the contact switch a predetermined time after initiation of movement of the means for effecting opening of the shutter.

9. The invention as defined in claim 8 in which there is a powered gear retarding mechanism and means for releasing said mechanism in response to initial movement of the shutter opening means, in which there is a locking device rendered operative after release of the said gear retarding mechanism and after closing of the said contact switch, for halting further movement of the shutter opening means while the shutter is still closed, said locking device being rendered inoperative in response to a predetermined running-down movement of the gear retarding mechanism.

10. The invention as defined in claim 8, in which the switch actuator includes a lost-motion driving connection to the means for effecting opening of the shutter.

11. The invention as defined in claim 2 in which the electromagnetic device is constituted as a rotary magnet and in which the locking part is mechanically actuated by the deflection part of the electromagnetic device as said deflection part reaches its position of maximum deflection.

12. The invention as defined in claim 1, in which the electromagnetic device comprises a moving-coil measuring device the movable part of which has a pointer, and in which there is an exposure-time scale cooperable with the said pointer.

13. The invention as defined in claim 3, in which there is a manually operable electric switch connected in parallel with the said contact-switch for connecting the said source of energy to the electromagnetic device independently of the said contact switch and independently of the condition of the camera shutter.

14. The invention as defined in claim 2, in which the said locking part and cooperable stop constitute the "B" lock of the camera.

15. The invention as defined in claim 1, in which there are means for altering the total amount of light which reaches the photoelectric element, thereby to take into consideration other factors of exposure of the camera.

16. The invention as defined in claim 15, in which the means for varying the total amount of light is coupled to the diaphragm setting mechanism of the camera to be influenced thereby as the diaphragm setting mechanism is adjusted to take into account exposure factors of the camera.

References Cited in the file of this patent

UNITED STATES PATENTS

| | | |
|---|---|---|
| 1,974,433 | Riszdorfer | Sept. 25, 1934 |
| 2,059,032 | Riszdorfer | Oct. 27, 1936 |
| 2,179,717 | Fedotoff | Nov. 14, 1939 |
| 2,179,718 | Fedotoff | Nov. 14 1939 |
| 2,226,602 | Frost | Dec. 31, 1940 |
| 2,577,774 | Lee | Dec. 11, 1951 |
| 2,780,971 | Fahlenberg | Feb. 12, 1957 |
| 2,887,025 | Rentschler | May 19, 1959 |